(12) United States Patent
Keam

(10) Patent No.: US 8,004,502 B2
(45) Date of Patent: Aug. 23, 2011

(54) CORRECTING FOR AMBIENT LIGHT IN AN OPTICAL TOUCH-SENSITIVE DEVICE

(75) Inventor: Nigel Keam, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 936 days.

(21) Appl. No.: 11/868,466

(22) Filed: Oct. 5, 2007

(65) Prior Publication Data

US 2009/0091554 A1 Apr. 9, 2009

(51) Int. Cl.
*G06F 3/042* (2006.01)
(52) U.S. Cl. ...... 345/175; 345/173; 345/176; 178/18.09
(58) Field of Classification Search .......... 345/173, 345/175, 176; 178/18.09
See application file for complete search history.

(56) References Cited

U.S. PATENT DOCUMENTS

| | | | |
|---|---|---|---|
| 3,674,008 A | 7/1972 | Johnson | |
| 5,742,279 A * | 4/1998 | Yamamoto et al. | 345/173 |
| 5,801,684 A * | 9/1998 | Uskali | 345/213 |
| 5,874,731 A | 2/1999 | Swanson | |
| 6,088,470 A | 7/2000 | Camus et al. | |
| 6,229,913 B1 | 5/2001 | Nayar et al. | |
| 6,339,748 B1 * | 1/2002 | Hiramatsu | 702/159 |
| 6,593,929 B2 | 7/2003 | Van Hook et al. | |
| 6,600,168 B1 | 7/2003 | Geng | |
| 6,714,665 B1 | 3/2004 | Hanna et al. | |
| 7,027,353 B2 | 4/2006 | Melese et al. | |
| 7,145,657 B2 | 12/2006 | Peterson et al. | |
| 2005/0083293 A1 | 4/2005 | Dixon | |
| 2005/0134751 A1 * | 6/2005 | Abileah et al. | 349/42 |
| 2005/0249390 A1 | 11/2005 | McClurg et al. | |
| 2006/0255152 A1 | 11/2006 | Xie et al. | |
| 2007/0176916 A1 | 8/2007 | Choe et al. | |

FOREIGN PATENT DOCUMENTS

JP 2007140260 A 6/2007

OTHER PUBLICATIONS

Ward, et al., "A Demonstrated Optical Tracker with Scalable Work Area for Head-Mounted Display Systems", ACM, 1992, pp. 43-52.
Chalfant, et al., "Experiments with an Automated Visual Inspection System", ICAR'97, Jul. 7-9, 1997, IEEE, 1997, pp. 965-970.
Gokturk, et al., "A Time-of-Flight Depth Sensor—System Description, Issues and Solutions", Jun. 2004, Canesta Inc., pp. 9.
ISA Korea, International Search Report of PCT/US2008/078515, May 20, 2009, 3 pages.

* cited by examiner

*Primary Examiner* — Amare Mengistu
*Assistant Examiner* — Koosha Sharifi
(74) *Attorney, Agent, or Firm* — Alleman Hall McCoy Russell & Tuttle LLP

(57) ABSTRACT

The correction of an image for ambient light in an optical touch-sensitive device is disclosed. For example, one disclosed embodiment comprises integrating a first field of pixels in an image data frame for a different duration of ambient light exposure than a second field of pixels in the image data frame. Intensity data is read from the first field of pixels and the second field of pixels, and an ambient light value is determined for one or more pixels in the image data frame from the intensity data. The ambient light value then is used to adjusting one or more pixels of the data frame for ambient light.

20 Claims, 9 Drawing Sheets

CORRECTING FOR AMBIENT LIGHT IN AN OPTICAL TOUCH-SENSITIVE DEVICE

BACKGROUND

Touch-sensitive devices may detect touch via several different mechanisms, including but not limited to optical, resistive, and capacitive mechanisms. Some optical touch-sensitive devices detect touch by capturing an image of a backside of a touch screen via an image sensor, and then processing the image to detect objects located on the screen. Such devices may include a light source within the device to illuminate the backside of the display screen such that objects on the screen reflect the incident light toward the image sensor, thereby allowing the object to be detected.

One difficulty that may be encountered with optical touch screen devices involves differentiating between external (ambient) light and light reflected from the light source within the device. Ambient light of sufficient brightness may be mistaken for an object touching the device, and therefore may degrade the performance of the device.

SUMMARY

Accordingly, various methods for correcting for ambient light in an optical touch-sensitive device are disclosed below in the Detailed Description. For example, one disclosed embodiment comprises integrating a first field of pixels in an image data frame for a different duration of ambient light exposure than a second field of pixels in the image data frame. Intensity data is read from the first field of pixels and the second field of pixels, and an ambient light value is determined for one or more pixels in the image data frame from the intensity data. The ambient light value then is used to adjusting one or more pixels of the data frame for ambient light.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
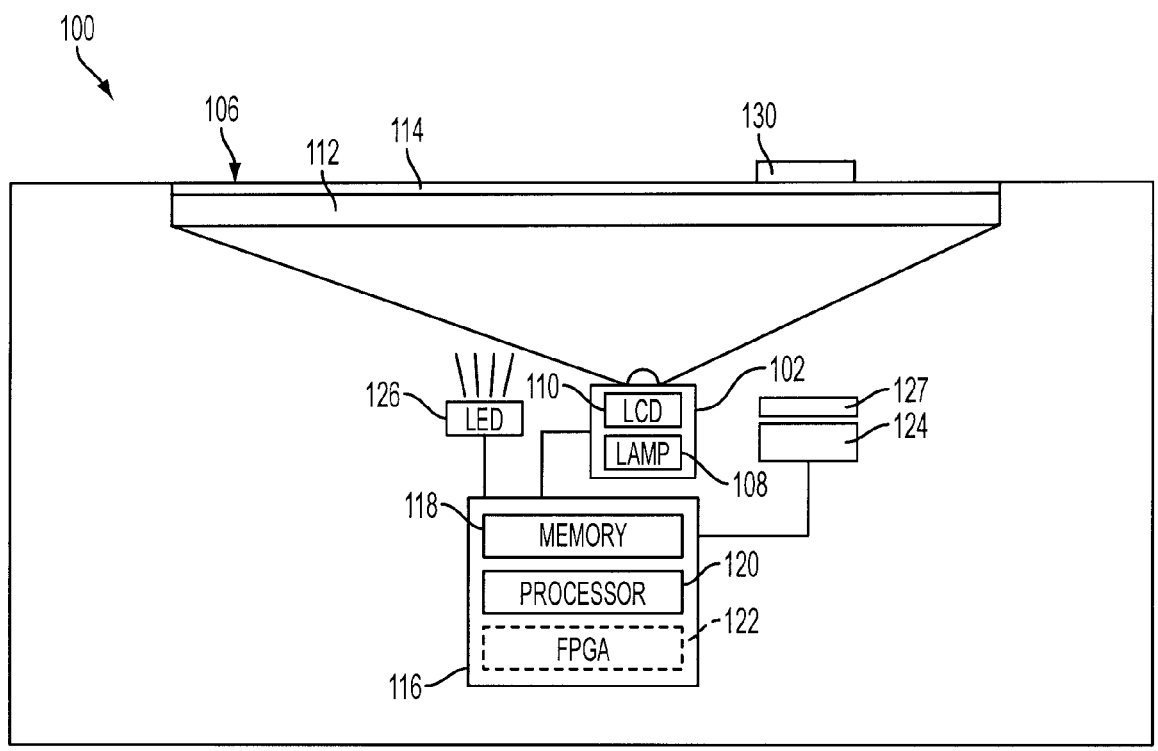
FIG. 1 shows an embodiment of an optical touch-sensitive device.

Prior to discussing the correction of an image in an optical touch-sensitive device for ambient light, an embodiment of one suitable use environment is described. FIG. 1 shows a schematic depiction of an embodiment of an interactive display device 100 utilizing an optical touch-sensing mechanism. Interactive display device 100 comprises a projection display system having an image source 102, and a display screen 106 onto which images are projected. While shown in the context of a projection display system, it will be appreciated that the embodiments described herein may also be implemented with other suitable display systems, including but not limited to LCD panel systems.

Image source 102 includes an optical or light source 108 such as a lamp (depicted), an LED array, or other suitable light source. Image source 102 also includes an image-producing element 110 such as the depicted LCD (liquid crystal display), an LCOS (liquid crystal on silicon) display, a DLP (digital light processing) display, or any other suitable image-producing element.

Display screen 106 includes a clear, transparent portion 112, such as sheet of glass, and a diffuser screen layer 114 disposed on top of the clear, transparent portion 112. In some embodiments, an additional transparent layer (not shown) may be disposed over diffuser screen layer 114 to provide a smooth look and feel to the display surface. Further, in embodiments that utilize a LCD panel rather than a projection image source to display images on display screen 106, the diffuser screen layer 114 may be omitted.

Continuing with FIG. 1, interactive display device 100 further includes an electronic controller 116 comprising memory 118 and a microprocessor 120. Controller 116 may further include a field programmable gate array (FPGA) 122, and/or any other suitable electronic components, including application-specific integrated circuits (ASICs) (not shown), digital signal processors (DSPs) (not shown), etc. configured to conduct one or more ambient light correction calculations, as described below. While shown as part of controller 116, it will be appreciated that FPGA 122 and/or other electronic components may also be provided as one or more separate devices in electrical communication with controller 116. It will further be understood that memory 118 may comprise instructions stored thereon that are executable by the processor 120 to control the various parts of device 100 to effect the methods and processes described herein. Likewise, the FPGA 122 also may be configured to perform one or more of the correction methods described in detail below.

To sense objects placed on display screen 106, interactive display device 100 includes an image sensor 124 configured to capture an image of the entire backside of display screen 106, and to provide the image to electronic controller 116 for the detection of objects appearing in the image. Diffuser screen layer 114 helps to avoid the imaging of objects that are not in contact with or positioned within a few millimeters of display screen 106, and therefore helps to ensure that only objects that are touching or in close proximity to display screen 106 are detected by image sensor 124.

Image sensor 124 may include any suitable image sensing mechanism. Examples of suitable image sensing mechanisms include but are not limited to CCD and CMOS image sensors. Further, the image sensing mechanisms may capture images of display screen 106 at a sufficient frequency to detect motion of an object across display screen 106. While the embodiment of FIG. 1 shows one image sensor, it will be appreciated that more than one image sensor may be used to capture images of display screen 106.

Image sensor 124 may be configured to detect reflected or emitted energy of any suitable wavelength, including but not limited to infrared and visible wavelengths. To assist in detecting objects placed on display screen 106, image sensor 124 may further include an illuminant 126 such as one or more light emitting diodes (LEDs) 126 configured to produce infrared or visible light. Light from illuminant 126 may be reflected by objects placed on display screen 106 and then detected by image sensor 124. The use of infrared LEDs as opposed to visible LEDs may help to avoid washing out the appearance of images projected on display screen 106. Further, an infrared bandpass filter 127 may be utilized to pass light of the frequency emitted by the illuminant 126 but prevent light at frequencies outside of the bandpass frequencies from reaching image sensor 124.

FIG. 1 also depicts an object 130 placed on display screen 106. Light from the illuminant 126 reflected by object 130 may be detected by image sensor 124, thereby allowing the object 130 to be detected on the screen. Object 130 represents any object that may be in contact with display screen 106, including but not limited to fingers, brushes, optically readable tags, etc.

In some use environments, ambient light sources may emit light in the band passed by bandpass filter 127. The term "ambient light" is used herein to describe light other than light from the illuminant 126. Examples of such ambient light sources include but are not limited to broad-spectrum light sources such as sunlight, incandescent lamp light, etc. Such light may have a sufficient intensity at the bandpass frequencies that the ambient light is difficult to distinguish from reflected light from the illuminant 126. Therefore, such ambient may cause the interactive display device 100 to mistakenly identify ambient light as an object on the display screen 106.

Various techniques may be used to cancel or otherwise correct for ambient light in an image captured by image sensor 124. For example, the illuminant 126, which may be referred to as "local" light, could be strobed such that alternate frames are exposed to "ambient-only" and "ambient+local" light. This allows the ambient light intensity to be determined by subtracting the "ambient-only" frame from the "ambient+local" frame to correct for ambient. However, because the local light is turned on only every other frame, this effectively cuts the frame rate of the device in half.

Another potential technique is to utilize a separate sensor (possibly with an optical filter) configured to integrate only ambient light. However, the use of an additional sensor may be expensive, and may be prone to errors due to the different positioning of the sensors in the device. Yet another potential technique may be to utilize an extremely bright local light source in combination with a band-pass filter to boost the intensity of reflected light relative to ambient light. However, this approach may be susceptible to failure where the ambient light exceeds some percentage of local light.

Figure 2:
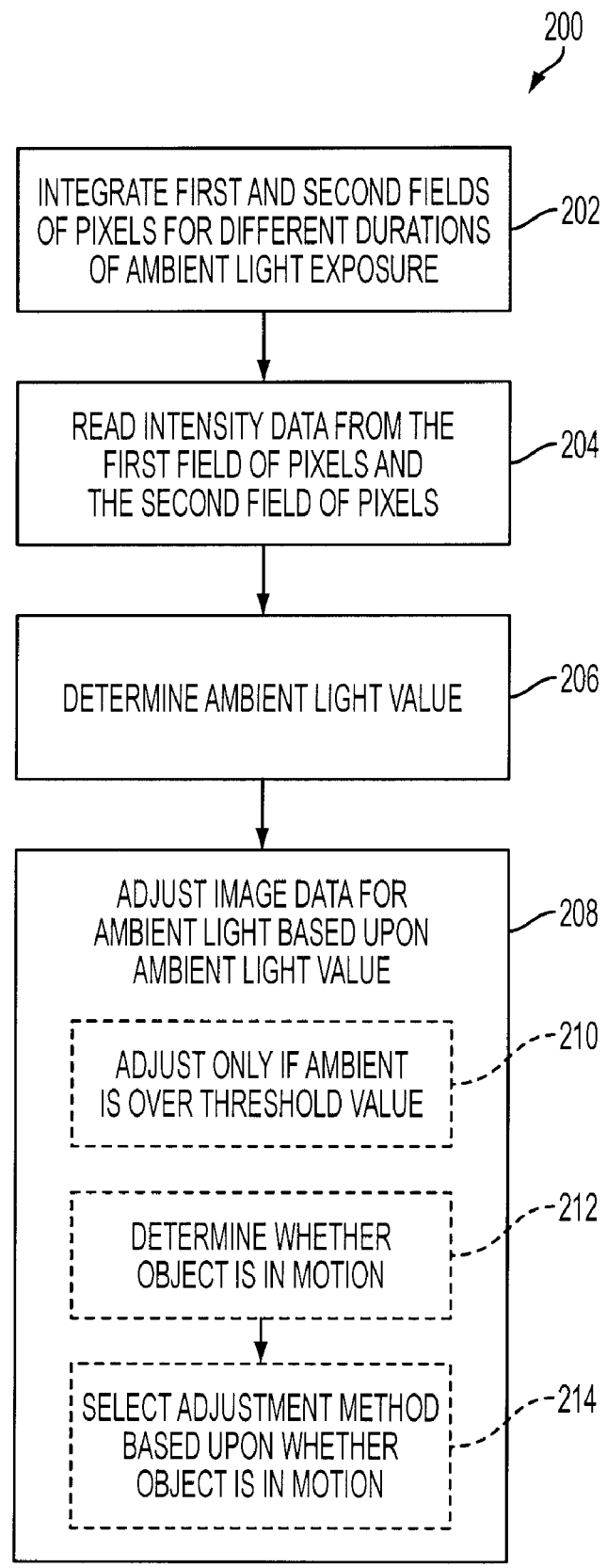
FIG. 2 shows a process flow depicting an embodiment of a method of correcting for ambient light in an optical touch-sensitive device.

FIG. 2 shows a flow diagram of a method for correcting an image for ambient light that may help to avoid the problems found in the methods described above. Method 200 first comprises, at 202, integrating first and second fields of pixels in an image sensor for different durations of ambient light exposure. Generally, this also involves integrating the first and second fields of images for an equal (or approximately equal) duration of ambient+local exposure such that both fields have been exposed to a similar duration of local light but different durations of ambient light. The two fields may be interlaced fields (for example, odd/even rows or odd/even columns of pixels), or may have any other suitable spatial relationship. Furthermore, in some embodiments, three or more fields of pixels may be exposed to different intervals of ambient light.

Next, method 200 comprises, at 204, reading intensity data from the first and second fields of pixels in the image sensor, and determining, at 206, a measure of ambient light from the difference between the intensity data from the first and second fields of pixels. Finally, method 200 comprises, at 208, adjusting the image data to correct for the ambient light based upon the determined measure of ambient light. In some embodiments, the image data may be adjusted only if it is first determined, at 210, if the ambient light measure is over a threshold value. Further, in some embodiments, it is first determined whether an object detected on the screen is in motion, as indicated at 212, and then an adjustment to make to the image data is selected at 214 based upon whether the object is determined to be in motion. Each of these decisions is discussed in more detail below.

Compared to other methods of correcting for ambient light, method 200 allows a correction for ambient light to be made to image data without the use of an additional image sensor or other additional parts, and also without any loss of frame rate. Each of the processes shown in method 200 is described in more detail below.

Figure 3:
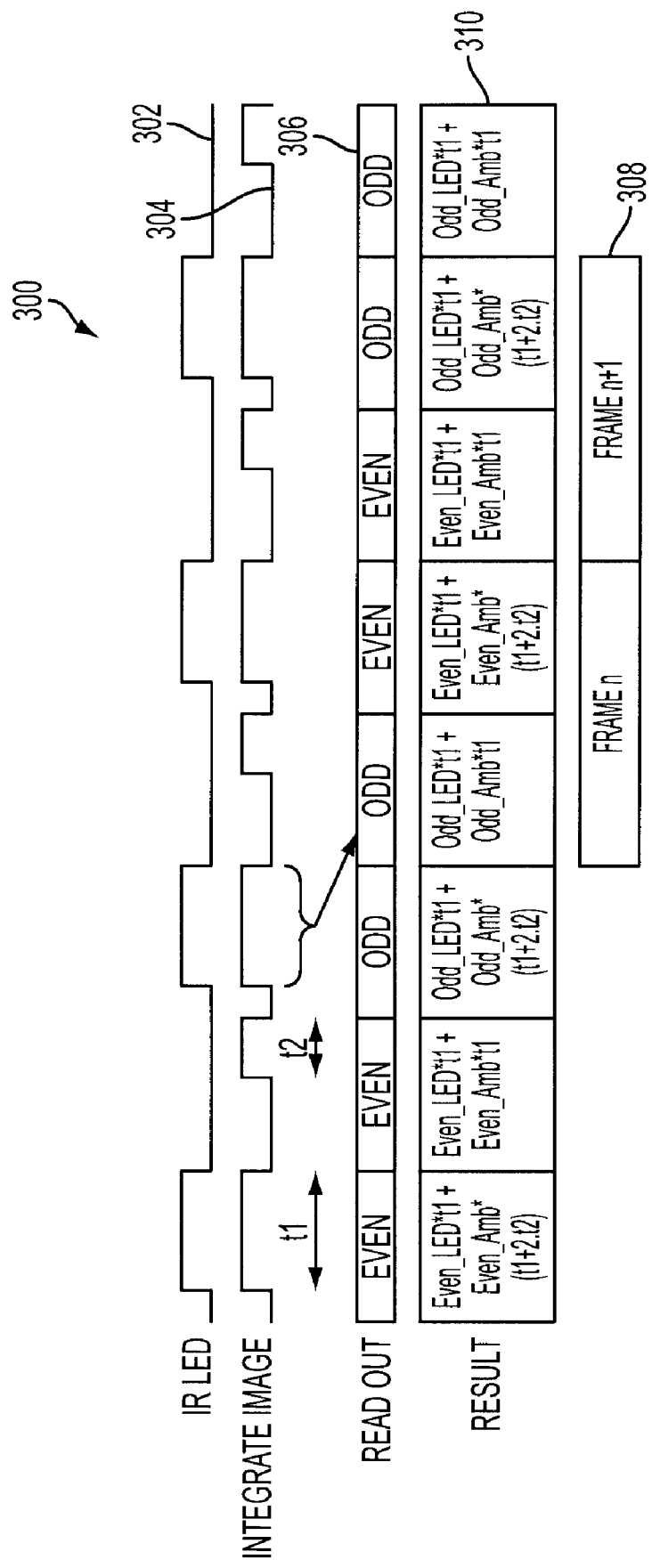
FIG. 3 shows a timing diagram depicting an embodiment of a method for integrating and reading an image sensor in an optical touch-sensitive device.

The integration of the first and second fields of pixels to different durations of ambient light but similar durations of local light in a single frame may be performed in any suitable manner. FIG. 3 illustrates a timing diagram 300 showing one manner of operating the illuminant 126 (shown in FIG. 3 as an LED) and the image sensor 124 to accomplish this. First, the illuminant 126 is operated in an off/on strobe pattern shown at 302 such that it is in an "on" state for a portion of an image frame and an "off" state for a portion of the image frame. According to this pattern, the illuminant 126 is in an "on" state for somewhat less than one-half the period of one frame. The sensor is then globally exposed (i.e. all fields are exposed) such that it integrates each frame for a period t1 during which the illuminant 126 is on (i.e. an "on" state interval) and a period t2 during which the illuminant 126 is off (i.e. an "off" state interval). The exposure pattern is shown in FIG. 3 at 304.

Using the LED strobe pattern and image sensor integration pattern shown in FIG. 3, the readout of the pixels of image data from the image sensor can be controlled such that different fields of pixels have different levels of ambient exposure in each frame. FIG. 3 shows this readout pattern in the context of odd/even rows of pixels, but it will be understood that the fields of pixels may have any other suitable spatial relationship to one another. Further, while disclosed herein in the context of utilizing two fields of pixels, it will be appreciated that the concepts also may be utilized with three or more fields of pixels.

Referring to the readout pattern shown at 306 and the frame identifier indicator shown at 308, the data for a first image data frame n is read out first from the odd frames, and then from the even frames. At the time of read-out, the image sensor pixels are reset to an unexposed state. Therefore, at the time the odd field of pixels of frame n is read out, the odd field pixels has integrated light for a period of t1 (i.e. since the beginning of the last odd pixel readout shown in pattern 306). On the other hand, at the time the even field of pixels of frame n is read out, the even field of pixels has integrated light for a t2 period, then a t1 period, and then another t2 period, for a total of t1+2(t2). The cumulative integration times for each frame are shown in FIG. 3 at 310.

Continuing with FIG. 3, the data for a next image data frame n+1 is read out first from the even frames, and then from the odd frames. Therefore, in frame n+1, the even field of pixels has integrated light for only a t1 period at the time of readout, while the odd field of pixels has integrated light for a period of t1+2(t2). As can be seen in FIG. 3, the odd fields have a greater ambient exposure than the even fields in frame n+1, while the even fields have a greater ambient exposure than the odd fields in frame n. It will further be noted that the image sensor integrated local light for a period of t1 for each frame. Thus, each frame has image data that can be used to identify objects on display screen 106, thereby allowing the frame rate to be preserved.

The periods t1 and t2 may have any suitable lengths, and may be the same or different from one another. In some use environments, t2 may be shorter than t1 to reduce the chance that the image sensor will saturate before reading, as saturation of the image sensor may lead to inaccurate calculations of ambient intensities. Further, where saturated pixels are detected, the length of t1 and/or t2 may be modified to reduce the total integration time of a frame to avoid saturation in future pixels. Likewise, where intensities are low, t1 and/or t2 may be increased to increase the amount of light integrated in future frames. Alternately or additionally, the gain on the image sensor may be adjusted dynamically to avoid saturation and/or to increase the response of the sensor to an amount of light exposure. Correcting an image for saturation is discussed in more detail below.

In other situations, it may be advantageous for t1 and t2 to have similar lengths. For example, where ambient light is fluctuating in intensity (i.e. incandescent light fluctuating at twice a line frequency of 50 or 60 Hz), the average incident ambient light strength will be different during the t2 phases compared to the t1 phases for at least some image frames (depending upon the frame rate compared to the fluctuation frequency). Thus, t2 may be adjusted to have an approximately equal length to t1 when fluctuating ambient light is detected.

By following the timing diagram in FIG. 3, the two fields of pixels in each image frame are integrated for different periods of ambient light exposure. Further, each single field of pixels has different periods of ambient light exposure in adjacent image frames. These differences in intra-frame and inter-frame ambient light exposure may be utilized in various ways to correct an image frame for ambient light.

Figure 4:
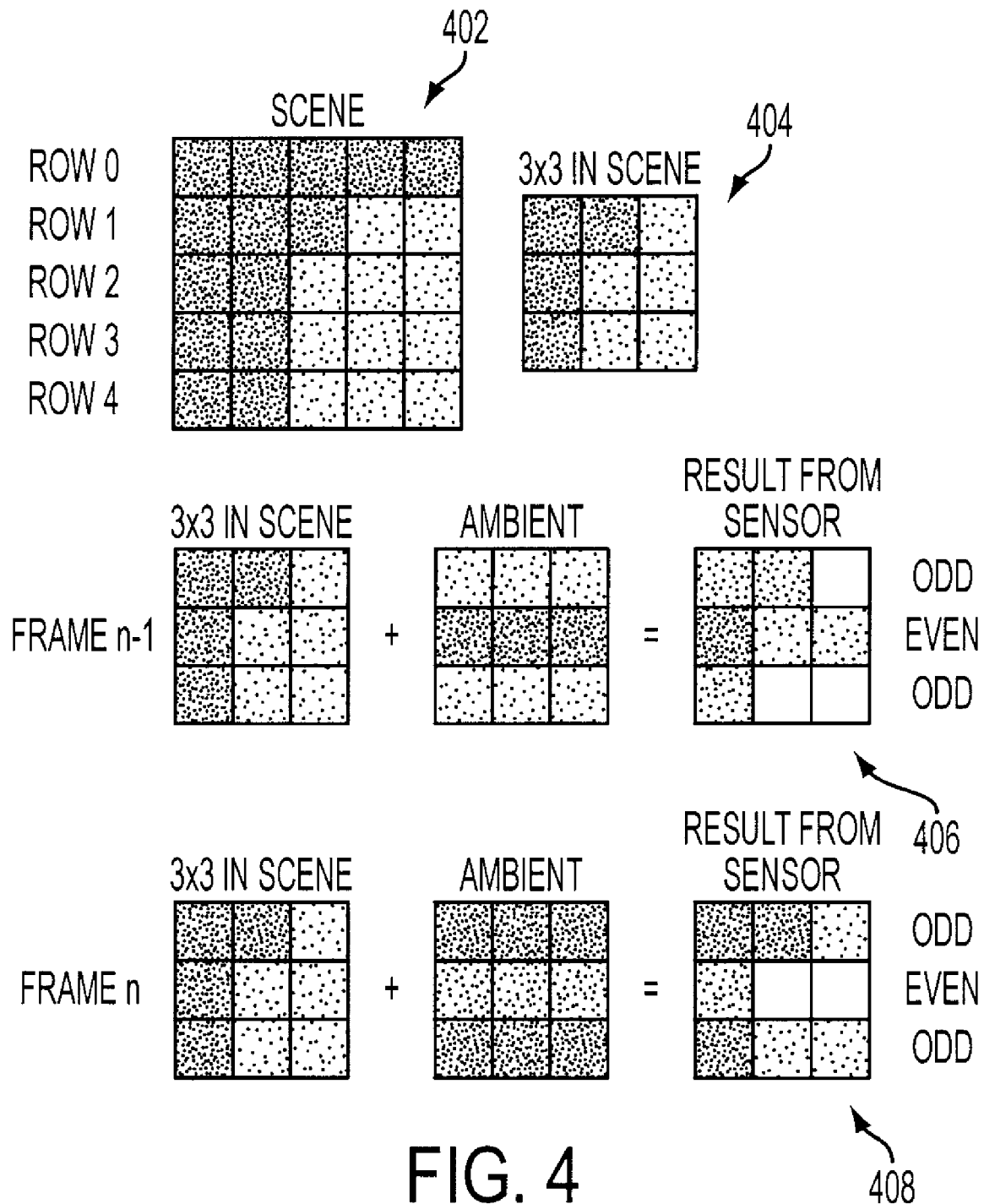
FIG. 4 shows a schematic depiction of intensity data of two fields of pixels in adjacent image frames captured according to the method of FIG. 3.

In order to illustrate various ambient correction methods, a representative group of intensity data from two image frames, labeled frames n−1 and n, are described with reference to FIG. 4. Specifically, FIG. 4 illustrates how the readout from the sensor for the two image frames, which show a stationary scene, may appear when integrated and read according to the process shown in FIG. 3. First, a simple stationary scene with no ambient light is shown at 402, and a 3×3 matrix of pixels from scene 402 is shown at 404. For the purpose of simplicity, the images in FIG. 4 have only three intensity levels, wherein the lightest pixels signify the most integrated light and the darkest pixels signify the least integrated light.

Figure 5:
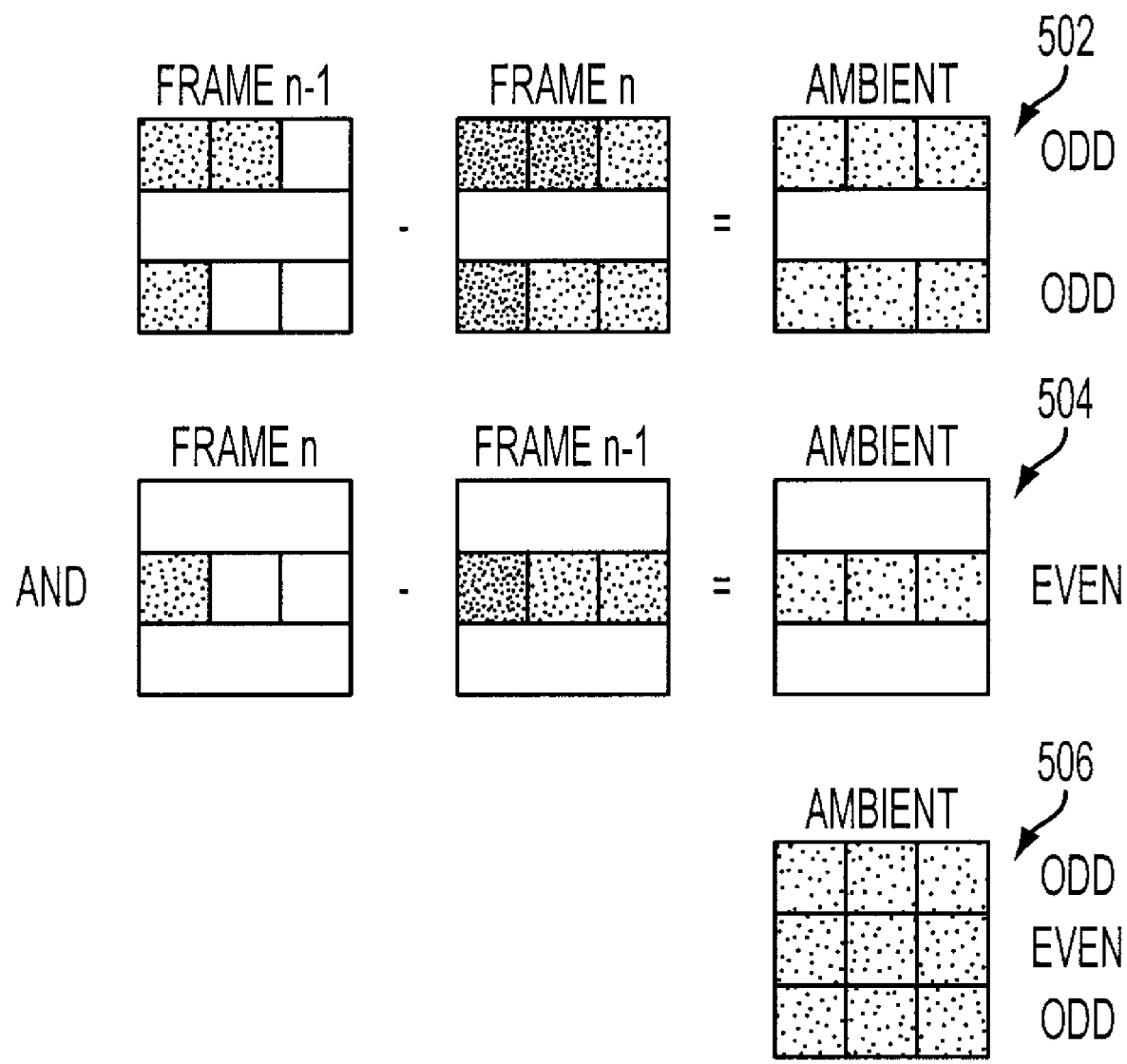
FIG. 5 shows a schematic depiction of one embodiment of a method of determining an ambient light value from the intensity data of FIG. 4.

In frame n−1, the odd rows have a greater interval of ambient exposure than the even rows. The addition of this ambient pattern to the 3×3 scene yields the intensity data shown at 406. Likewise, in frame n, the even rows have a greater interval of ambient exposure than the odd rows. The addition of this ambient pattern to the 3×3 scene yields the intensity data shown at 408. Referring next to FIG. 5, the ambient light can be calculated for the odd rows by subtracting frame n from frame n−1 (as shown at 502), and for the even rows by subtracting frame n−1 from frame n (as shown at 504). Combining the ambient determined for the odd rows with the ambient determined for the even rows yields an overall ambient 506 for the 3×3 matrix.

Figure 6:
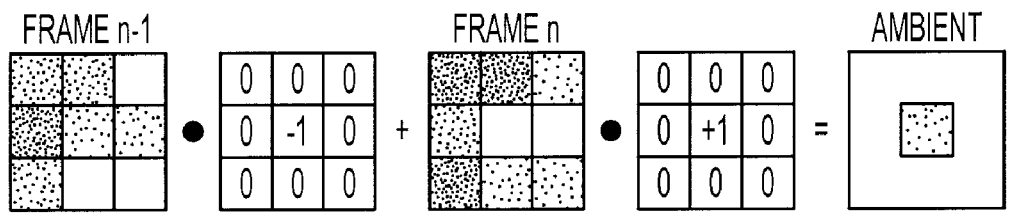
FIG. 6 shows a schematic depiction of another embodiment of a method of determining an ambient light value from the intensity data of FIG. 4.
Figure 7:
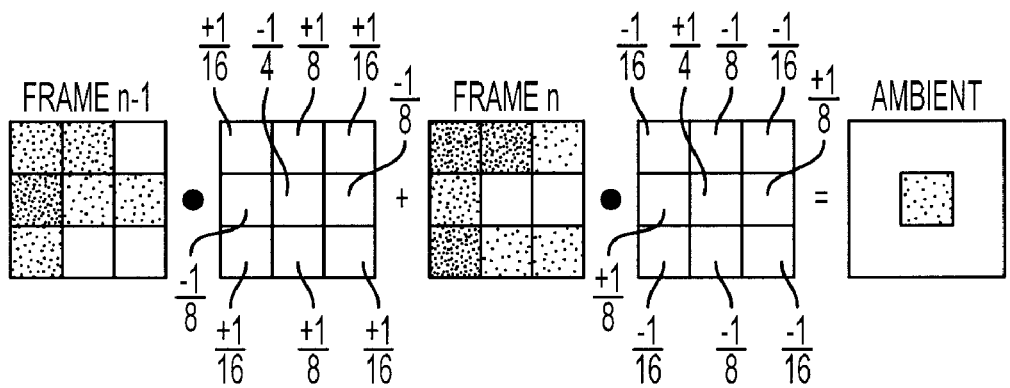
FIG. 7 shows a schematic depiction of another embodiment of a method of determining an ambient light value from the intensity data of FIG. 4.
Figure 8:
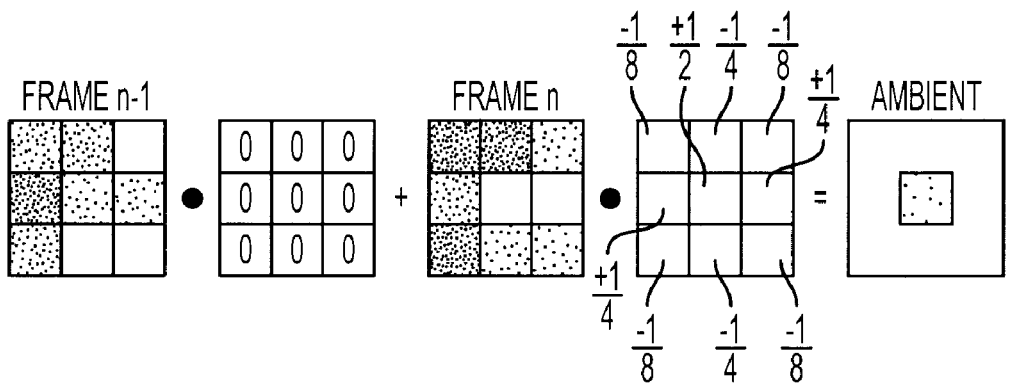
FIG. 8 shows a schematic depiction of another embodiment of a method of determining an ambient light value from the intensity data of FIG. 4.

FIGS. 6-8 show examples of various methods that may be used to correct an image frame for ambient light with the image data shown in FIG. 4. These figures are shown in the context of determining ambient for a single pixel at a time. This may allow different ambient calculation methods to be used for different pixels depending upon pixel-specific factors.

First referring to FIG. 6, an ambient light value at a pixel (for example, the center pixel of the 3×3 matrix shown in FIGS. 4-5) may be calculated as described above for FIG. 5 by simply subtracting frame n−1 from frame n. Likewise, ambient for pixels in the top and bottom rows of the 3×3 matrix may be determined simply by subtracting frame n from frame n−1. This method utilizes information from temporally adjacent frames but does not utilize information from spatially adjacent pixels. Therefore, the method illustrated in FIG. 6 may be referred to herein as a "temporal-local" correction. However, due to the sensor readout pattern shown in FIG. 3, after subtraction of ambient, the intensity at that pixel is the same as in an adjacent frame. Thus, the temporal-local correction may effectively halve the frame rate of the device. For this reason, this correction may be used for stationary objects.

FIG. 7 shows another example of a method for correcting an image frame for ambient light. As opposed to that shown in FIG. 6, the method shown in FIG. 7 takes into account both temporal information (i.e. temporally adjacent image frames) and spatial information (i.e. spatially adjacent pixels) when calculating the ambient for a pixel. Therefore, the method shown in FIG. 7 may be referred to as a "temporal-spatial" correction. While shown in the context of a 3×3 matrix, it will be appreciated that the concepts shown in FIG. 7, as well as FIG. 8, may be applied to a matrix of any size of pixels and any shape/pattern around the pixel of interest, including but not limited to 5×5 and 7×7 matrices, as well as other shapes (such as a cross-shaped matrix formed by omitting each corner pixel from a 5×5 matrix).

The temporal-spatial correction shown in FIG. 7 utilizes a weighted average intensity of the pixels in the sample matrix to determine an ambient value, wherein the center pixel is weighted more strongly (¼) than the side pixels (⅛ each), which are in turn weighted more strongly than the corner pixels. To perform the correction, the intensities of the pixels are multiplied by the shown weighting factors, the two frames are added, and then the value at each pixel in the matrix after the addition of the two frames is summed to yield the ambient intensity at the center pixel. Because spatial data is taken into account in addition to temporal data, the temporal-spatial correction allows a frame rate to be maintained.

FIG. 8 shows another example of a method for correcting an image frame for ambient light. As opposed to the methods shown in FIGS. 6 and 7, the method of FIG. 8 utilizes only spatial information, and not temporal information, in making the ambient correction. In other words, the correction is made entirely from a weighted average of intra-frame data, utilizing no inter-frame data. As depicted, this calculation may lead to slightly high values of ambient light, but can avoid calculation problems due to motion that may occur in methods that utilize temporal information.

Figure 9:
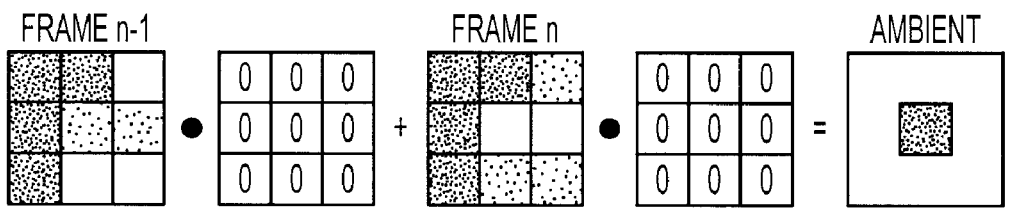
FIG. 9 shows a schematic depiction of another embodiment of a method of determining an ambient light value from the intensity data of FIG. 4.

In some embodiments, it may be determined whether the global ambient light exceeds a predetermined threshold level before performing any of the above ambient correction methods. Where ambient light is of sufficiently low intensity or is absent, the touch-sensitive device may be able to detect objects without any problems caused by ambient. Therefore, before performing any of the above-described corrections (or any others), it may be determined whether there is any potentially problematic ambient by comparing the sum of the intensities in the first field in a frame to the sum of the intensities in the second field in the frame. Because the intensities in the two fields differ by the amount of ambient light integrated, if the sums are relatively close together, it can be determined that the ambient light levels are sufficiently low not to interfere with device operation, and correction for ambient may be omitted, as shown in FIG. 9.

Figure 10A:
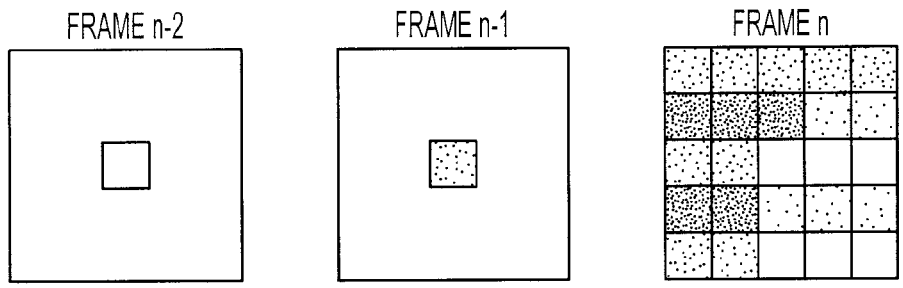
FIGS. 10A-D show a schematic depiction of another embodiment of a method of determining an ambient light value from the intensity data of FIG. 4.
Figure 10B:
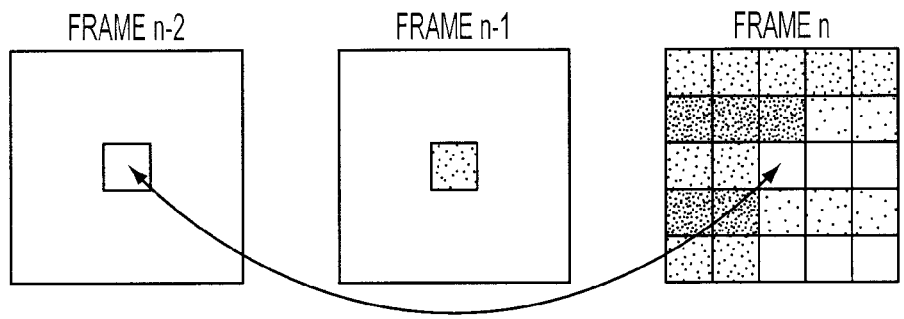
Figure 10C:
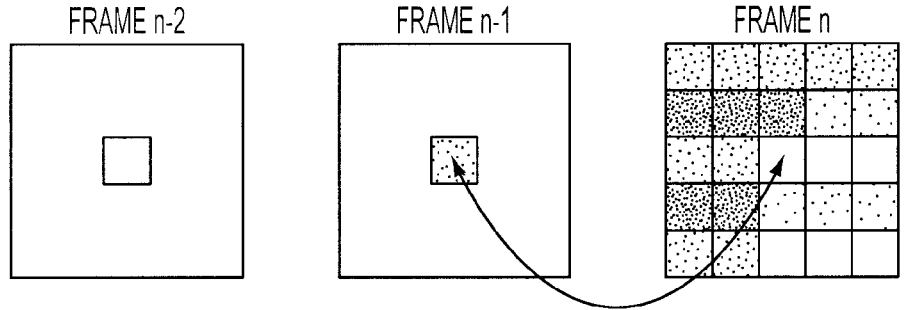

FIGS. 10A-D illustrate another embodiment of a method for correcting for ambient. Referring first to FIG. 10A, a 5×5 region of pixels in a current frame (frame n) and a single pixel in two prior frames (frames n−1, n−2) are considered for ambient correction. However, it will be appreciated that a 3×3 region of pixels, or any other suitable region of pixels, in a current frame may be considered in the ambient correction. First referring to FIG. 10A, a center of a current frame is compared to a pixel from frame n−2, which was read in the same field order. If the difference between these pixels exceeds a threshold amount, this indicates that motion may have occurred, and a "motion flag" for that pixel is set. The value of the motion flag is compared to motion flags for nearby pixels (for example, via a Boolean "OR" operation), and if the result is zero (i.e. frame n−2 and frame n look the same in a local region), then a temporal ambient correction is performed by determining difference between a current center pixel in frame n and the same pixel in frame n−1, as indicated in FIG. 10C.

Figure 10D:
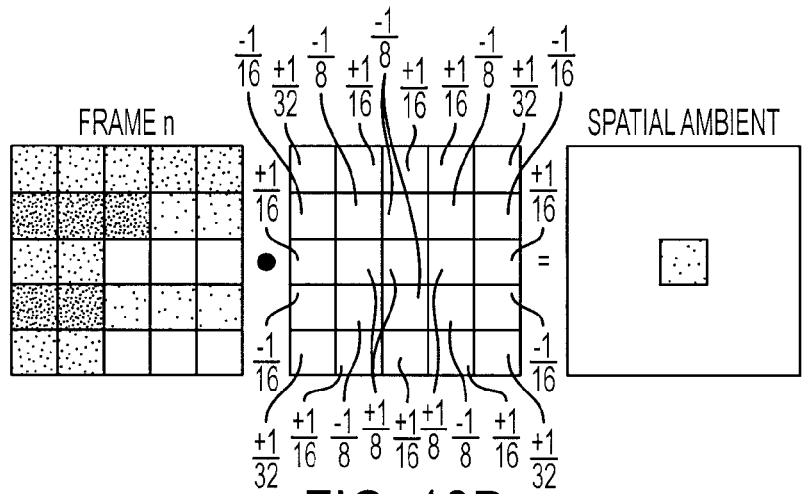

On the other hand, if the OR operation with adjacent motion flags result in a value of 1, this indicates that there has been some nearby motion in this frame. In this case, prior frames may be ignored for the ambient correction, and a spatial correction utilizing adjacent pixels in frame n is performed. Any suitable weighting factor scheme may be used to perform this spatial correction. FIG. 10D shows one non-limiting example of a suitable weighting factor scheme for a 5×5 pixel spatial correction.

The determination of whether to utilize a 5×5 or a 3×3 pixel region for ambient correction may depend upon factors such as the resolution and stability of the image sensor. For example, a 3×3 region may yield a slightly noisier result, while a 5×5 region may blur the result slightly. Other region sizes may be used, including but not limited to a 1×3 region (which may be noisier than a 3×3 region).

Figure 11:
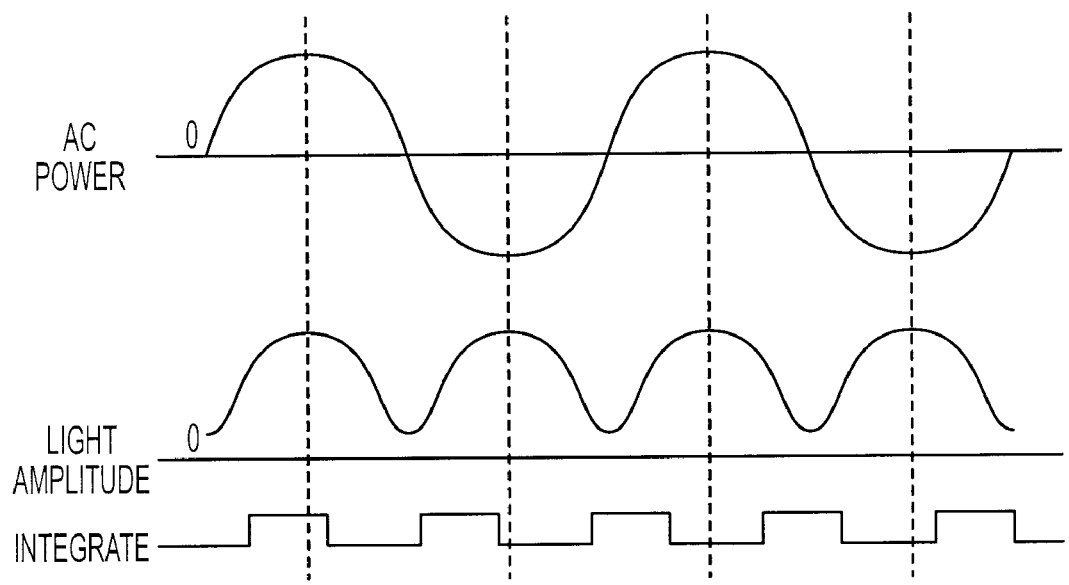
FIG. 11 shows a timing diagram of an ambient light frequency compared to a frame rate prior to correction of the frame rate.

Some ambient sources may fluctuate in a periodic manner. For example, electric lighting generally fluctuates at a frequency of twice the line frequency, which may be either 50 or 60 Hz depending upon location. This is illustrated graphically in FIG. 11. Where the frame rate of the device has a frequency other than the line frequency or 2× the line frequency, the ambient light detected by the image sensor will have a beat frequency detectable as a periodic variation in the ambient light level. Such variations in ambient light levels may cause problems when temporal information is used in correcting for ambient. These problems may be pronounced where the ambient light fluctuations are large between adjacent frames, which may occur if a frame rate of 100 Hz is used in the presence of 120 Hz ambient, or vice versa. For the purpose of simplicity, FIG. 10 only shows a single integration period (t1) per frame, but it will be understood that similar problems would be encountered with the use of multiple integration periods per frame, as shown in FIG. 3.

Figure 12:
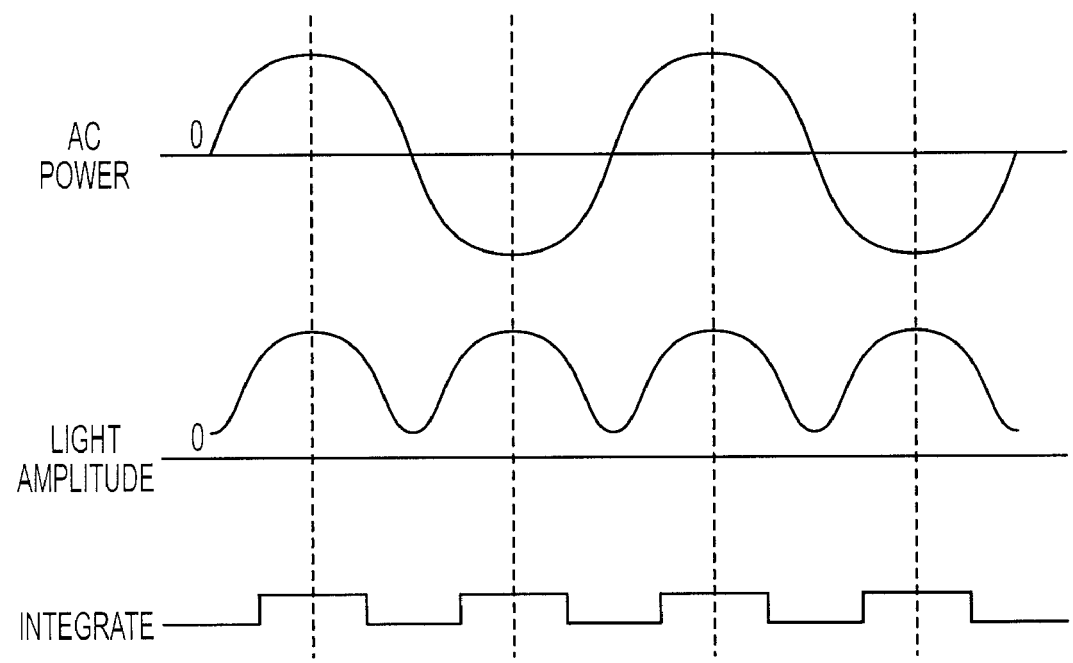
FIG. 12 shows a timing diagram of an ambient light frequency compared to a frame rate after correction of the frame rate.

To prevent such problems caused by fluctuating ambient light levels, the frame rate of an optical touch-sensitive device may be set to equal the line frequency or 2× the line frequency. For example, this setting may be stored in the system, derived from a local power source, or detected optically. The fluctuation may be detected optically by observing a beat frequency in the overall levels of detected light, or by monitoring frame-to-frame variation in the amount of total ambient light measured. If the detected ambient light fluctuation frequency is not the same as the frame rate of the device, the frame rate can then be adjusted so that it matches the ambient light frequency, as shown in FIG. 12.

Figure 13:
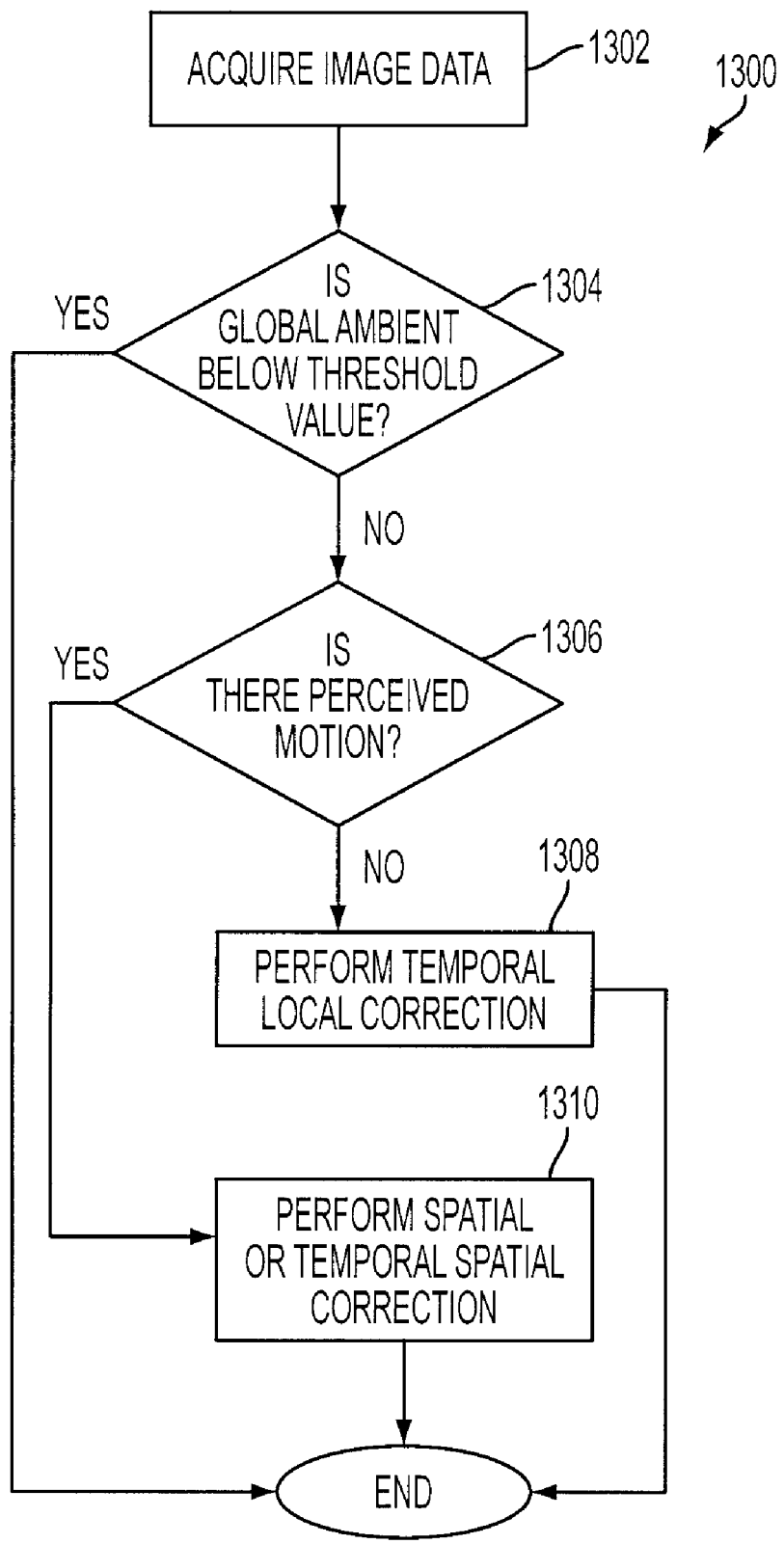
FIG. 13 shows a process flow depicting an embodiment of a method of correcting for ambient light in an optical touch-sensitive device.

FIG. 13 shows a process flow of a method 1300 for performing an ambient light correction that takes into account the various factors described above. The method of FIG. 13 may be performed on a pixel-by-pixel basis, or in any other suitable manner. Method 1300 first comprises, at 1302, acquiring image data frames, and then, at 1304, determining for an image data frame whether the global ambient is below a threshold value. This can be determined, for example, by subtracting the sum of the intensities of all pixels in a first field from the sum of all intensities of pixels in a second field, and determining if the result of the calculation is below a threshold value.

If the global ambient is below a threshold value, then method 1300 ends without performing any correction. On the other hand, if the global ambient is not below a threshold value, then method 1300 comprises, at 1306, determining whether any motion is perceived in the intensity data. This may be performed, for example, by subtracting the intensity value for the pixel in the current frame (frame n) from the intensity value for the same pixel in frame n−2 (as the same pixel in n−1 has a different ambient exposure time). If the difference between these intensity values is sufficiently small, then it can be determined that the intensity data contains no motion information. In this case, a temporal local correction that utilizes no spatial information may be performed, as indicated at 1308. On the other hand, if the differences between the intensity values is sufficiently large, it can be assumed that the pixel contains motion data (as long as the frame rate has been corrected for any periodically fluctuating ambient light), and either a spatial or a temporal-spatial correction may be used, as indicated at 1310.

The decision whether to utilize a spatial or temporal-spatial correction may be made in any suitable manner. Generally, a spatial correction may be used where all spatial variation in a frame can be corrected with other information in the frame. One example of a method for making this determination is as follows. First, if any pixels in row (i−1) of the sample matrix differ significantly from the pixels in the same column in row (i+1), there is spatial information that may be corrected via a temporal-spatial correction. Likewise, if any of the pixels in row (i) of the sample matrix minus the mean for row (i) differs significantly from the corresponding pixels in row (i−1) minus the mean for the pixels in row (i−1) then there is spatial information that may be corrected via a temporal-spatial correction. In other cases where there is perceived motion but these conditions are not met, a spatial correction may be used. Alternatively, either a spatial or temporal-spatial may be used exclusive of the other where motion information is contained in a frame.

The correction calculations and calculation selection routine described above may be performed in any suitable manner. For example, in one embodiment, an FPGA (as shown at 122 in FIG. 1) may be programmed to perform a plurality of different correction calculations simultaneously for each frame. Then, the best ambient value for each pixel in a frame may be selected based upon the specific temporal and local characteristics of that pixel, as described for method 1200. Alternatively, the best ambient calculation for a pixel may be determined before performing the correction, such that only one correction is performed for each pixel. It will be appreciated that these specific examples of how to perform an ambient correction from the intensity data integrated and collected are described only for the purpose of illustration, and are not intended to be limiting in any manner.

As described above, where saturation of the image sensor is detected, the lengths of the integration periods t1 and/or t2 may be adjusted to prevent saturation in future frames. Further, a frame in which saturation is detected may also be processed in a manner to correct for the saturation. As an example, if saturated pixels are observed, it can be assumed that the saturated pixels are directly exposed to ambient light (as reflected light from the illuminant is generally not sufficiently intense to cause saturation). Therefore, in this situation, all light in the saturated region can be deemed to be ambient. Where saturation exists, a noise margin may exist around the saturated pixels. To avoid discontinuities in the corrected image in the noise margin region, a minimum ambient level may be determined for this region by setting one possible ambient using the near-saturation test, and another using a computed ambient as described above. The higher of these two values may then be used as the value to be subtracted from the image when correcting pixels in this region for ambient.

While disclosed herein in the context of an interactive display device, it will be appreciated that the disclosed embodiments may also be used in any other suitable optical touch-sensitive device, as well as in any other touch-sensitive device in which a background signal correction may be performed to improve device performance.

It will further be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of any of the above-described processes is not necessarily required to achieve the features and/or results of the embodiments described herein, but is provided for ease of illustration and description.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method of correcting an image for ambient light in an optical touch-sensitive device, the optical touch-sensitive device comprising a screen, a light source and an image sensor with two or more fields of pixels, the method comprising:
    integrating a first field of pixels in an image data frame for a different duration of ambient light exposure than a second field of pixels in the image data frame;
    reading intensity data from the first field of pixels and the second field of pixels;
    determining an ambient light value for one or more pixels in the image data frame from the intensity data; and
    adjusting one or more pixels of the data frame for ambient light based upon the ambient light value.

2. The method of claim 1, wherein the first field of pixels comprises even rows or even columns of pixels, and wherein the second field of pixels comprises odd rows or odd columns of pixels.

3. The method of claim 1, further comprising reading intensity data first from the first field of pixels and next from the second field of pixels in one image data frame, and then reading intensity data first from the second field of pixels and next from the first field of pixels in a next image data frame.

4. The method of claim 1, wherein adjusting the data frame for ambient light comprises first determining whether ambient light exceeds a threshold level, and then correcting for ambient light only if the ambient light exceeds the threshold level.

5. The method of claim 4, further comprising determining if any objects are in motion on the screen, and selecting an ambient correction method for use depending upon whether or not any objects are detected in motion on the screen.

6. The method of claim 1, further comprising, during integration of each image data frame of a plurality of image data frames:
    exposing the image sensor for an "on" state interval during which the light source is in an "on" state and for an "off" state interval during which the light source is in an "off" state; and
    for alternating frames n and n+1
        for frame n, reading intensity levels of the first field of pixels after integration of one "on" state interval, and then reading levels of the second field of pixels after integration of one "on" state interval and two "off" state intervals; and
        for frame n+1, reading intensity levels of the second field of pixels after integration of one "on state interval, and then reading levels of the first field pixels after integration of one "on" state interval and two "off" state intervals.

7. The method of claim 6, further comprising adjusting one or more of a length of the interval during which the image sensor is exposed while light source is in the "on" state and a length of the interval during the image sensor is exposed which the light source is in the "off" state to reduce saturation of the image sensor or to increase an amount of light integrated.

8. The method of claim 6, further comprising detecting saturation of one or more pixels, and reducing a duration that the image sensor is exposed to light during one or more of the "on" state and the "off" state of the light source.

9. The method of claim 1, further comprising determining ambient light values for a plurality of frames, measuring an ambient light beat frequency using the ambient light values, and adjusting a frame rate of the device based upon the ambient light beat frequency.

10. A method of correcting image data frames for ambient light in an optical touch-sensitive device, the optical touch-sensitive device comprising a screen, a light source, and an image sensor with two or more interlaced fields of pixels, the method comprising:

during integration of each image data frame, operating the light source in an "on" state for part of the frame and an "off" state for part of the frame;

during integration of each image data frame, integrating a first field of pixels in an image data frame for a different duration of ambient light exposure than a second field of pixels in the image data frame while the light source is in an "off state";

integrating light for an equal period of time with the first field of pixels and the second field of pixels while the light source is in an "on" state;

reading intensity data from the first and second fields of pixels; and adjusting the image data frame for ambient light based upon differences in intensity data from the first field of pixels and intensity data from the second field of pixels.

11. The method of claim 10, further comprising reading intensity data first from the first field of pixels and next from the second field of pixels in one image data frame, and then reading intensity data first from the second field of pixels and next from the first field of pixels in a next image data frame.

12. The method of claim 10, wherein adjusting the data frame for ambient light comprises first determining whether ambient light exceeds a threshold level, and then correcting for ambient light only if the ambient light exceeds the threshold level.

13. The method of claim 12, further comprising determining if any objects are in motion on the screen, and selecting an ambient correction calculation for use depending upon whether or not any objects are detected in motion on the screen.

14. The method of claim 10, further comprising:
for alternating frames n and n+1
for frame n, reading intensity levels of the first field of pixels after integration of one "on" state interval, and then reading levels of the second field of pixels after integration of one "on" state interval and two "off" state intervals; and
for frame n+1, reading intensity levels of the second field of pixels after integration of one "on" state interval, and then reading levels of the first field pixels after integration of one "on" state interval and two "off" state intervals.

15. The method of claim 10, further comprising adjusting one or more of a length of the "on" state interval and a length of the "off state" interval based upon one or more characteristics of the intensity data, wherein the characteristics comprise relative levels of pixel saturation determined from the intensity data.

16. An optical touch-sensitive device, comprising:
a screen having a touch surface and a backside;
an image sensor configured to capture an image of a backside of the screen and comprising two or more interlaced fields of pixels;
a light source configured to illuminate the backside of the screen; and a controller configured to:
modulate the light source during capture of image data frames, modulate exposure of the image sensor to light during capture of the image data frames such that the image sensor integrates each image data frame for a portion of time when the light source is operating in an "on" state and a portion of time when the light source is operating in an "off" state,
integrate a first field of pixels in the image data frames for a different duration of ambient light exposure than a second field of pixels in the image data frames, the integrating the first field of pixels for a different duration of ambient light exposure than the second field of pixels comprising:
reading a first image data frame from the image sensor such that the first field of pixels is read before the second field of pixels, and reading a next image data frame from the image sensor such that the second field of pixels is read before the first field of pixels, wherein reading the first image data frame and reading the next image data frame further comprises, for alternating frames n and n+1:
for frame n reading intensity levels of the first field of pixels after integration of one "on" state interval, and then reading levels of the second field of pixels after integration of one "on" state interval and two "off" state intervals; and for frame n+1, reading intensity levels of the second field of pixels after integration of one "on" state interval~and then reading levels of the first field pixels after integration of one "on" state interval and two "off" state intervals.

17. The device of claim 16, wherein the controller is configured to determine an ambient light value for one or more pixels in each image data frame from differences in intensity data between the first field of pixels and the second field of pixels, and to adjust one or more pixels of the image data frame for ambient light based upon the ambient light value.

18. The device of claim 17, wherein the controller is configured to determine whether the ambient light value exceeds a threshold level, and then to adjust one or more pixels of the image data frame for ambient light only if the ambient light value exceeds the threshold level.

19. The device of claim 17, wherein the controller is configured to determine if any objects are in motion on the screen, and to select an ambient correction calculation for use depending upon whether or not any objects are detected in motion on the screen.

20. The device of claim 19, further comprising a field programmable gate array configured to perform multiple ambient correction calculations from which an ambient light value can be selected depending upon whether or not any objects are detected in motion on the screen.

* * * * *